United States Patent [19]

Nakayama et al.

[11] 3,853,928

[45] Dec. 10, 1974

[54] PROCESS FOR PREPARING TERTIARY PHOSPHORIC ESTERS OF PHENOLATED FATTY ACID ESTERS

[75] Inventors: Hirokazu Nakayama; Yoshiaki Inamoto; Atsushi Goukon, all of Wakayama, Japan

[73] Assignee: Kao Soap Co. Ltd., Tokyo, Japan

[22] Filed: Dec. 20, 1972

[21] Appl. No.: 316,682

[30] Foreign Application Priority Data

Dec. 28, 1971   Japan.................................. 46-2774

[52] U.S. Cl. .............................................. 260/403
[51] Int. Cl............................ A23j 7/00, C07f 9/02
[58] Field of Search ..................................... 260/403

[56] References Cited

UNITED STATES PATENTS

| | | | |
|---|---|---|---|
| 2,987,385 | 6/1961 | De Gray | 260/403 |
| 3,346,667 | 10/1967 | Firth | 260/403 |
| 3,539,601 | 11/1970 | Lewis | 260/403 |
| 3,567,466 | 3/1971 | Fearing et al. | 260/403 |

*Primary Examiner*—Elbert L. Roberts
*Attorney, Agent, or Firm*—Woodhams, Blanchard and Flynn

[57] ABSTRACT

Tertiary phosphoric esters of phenolated fatty acid esters are prepared by reacting a phenolated fatty acid ester with phosphorus oxyhalide.

3 Claims, No Drawings

PROCESS FOR PREPARING TERTIARY PHOSPHORIC ESTERS OF PHENOLATED FATTY ACID ESTERS

BACKGROUND OF THE INVENTION

1. Field of the Invention

This invention relates to a process for preparing novel tertiary phosphoric esters of phenolated fatty acid esters.

More particularly, this invention relates to a process for preparing tertiary phosphoric esters of phenolated fatty acid esters, prepared by nuclear alkylation of phenol or cresols with unsaturated fatty acid esters by making use of the unsaturated bonds of the latter.

The invention provides a process for preparing novel tertiary phosphoric esters. The compounds prepared by the process of this invention are very useful substances, because they are much superior to conventional phosphoric esters having linear aliphatic or aromatic residual groups with respect to such properties as viscosity index and friction coefficient when used as additives for synthetic lubricants and hydraulic oils, and also have many other characteristic advantageous properties that the conventional phosphoric esters do not possess.

2. Summary of the Invention

The invention provides a process for preparing tertiary phosphoric esters of phenolated fatty acid esters, by reacting a phenolated fatty acid ester with phosphorus oxyhalide.

The end products of the present invention, i.e., tertiary phosphoric acid esters of phenolated fatty acid esters, can be obtained by heating a phenolated fatty acid ester with phosphorus oxyhalide generally at a temperature in the range of 100° – 200° C for 1 – 6 hours in the presence or absence of a metal catalyst or a tertiary amine. The reaction time and reaction temperature are reduced by the use of the metal catalyst or tertiary amine. Therefore, the reaction temperature and the reaction time are not particularly limited, so long as they are selected to achieve economic production of the final product.

When the fatty acid moiety of phenolated fatty acid ester contains a carbon-to-carbon unsaturated bond, hydrogen halide which is produced by the reaction of phenolated fatty acid ester with phosphorus oxyhalide, adds to the unsturated bond, and partially halogenated tertiary phosphoric esters are obtained. When the reaction is carried out at a low temperature in the presence of a tertiary amine in place of metal catalyst, hydrogen halide produced in the reaction forms a salt with the tertiary amine. Thus, a tertiary phosphoric ester containing an unsaturated bond can be obtained even if the carbon-to-carbon unsaturated bond is contained in the fatty acid moiety.

Metal catalysts are effective in the process of the present invention, and they include all known catalysts which have been used for the preparation of phosphoric esters of phenols, such as alkaline earth metals and oxides and chlorides thereof, aluminum, aluminum chloride and ferric chloride. The tertiary amines are also effective, and they include, for example, aliphatic tertiary amines such as trimethylamine, triethylamine and dimethyllaurylamine, aromatic tertiary amines such as dimethylaniline, dimethyl-p-toluidine, diethylaniline and 4,4'-bis(dimethylamino)diphenylmethane and heterocyclic aromatic amines such as pyridine and quinoline.

The phenolated fatty acid esters used as a starting material in the present invention are obtained most easily by condensing unsaturated fatty acid esters with phenol or cresols in the presence of an acidic catalyst. By this reaction, aromatic nuclear alkylation of the phenol or cresols with the unsaturated bond of the unsaturated fatty acid esters is attained. Generally, 1 – 2 moles of unsaturated fatty acid ester are condensed with 1 mole of the phenolic compound and yield monophenol/monocarboxylic acid ester and monophenol/dicarboxylic acid ester. In industrial production, generally two products are obtained in the form of a mixture. It is apparent from an embodiment of the present invention that pure phenol/monocarboxylic acid ester and phenol/dicarboxylic acid ester, and, in addition, a mixture of them can be used as a starting material of the present invention.

Suitable unsaturated fatty acids from which are made unsaturated fatty acid esters, which are precursors for the starting material of the present invention, are, for example, various mono- and polyolefinic carboxylic acids such as aliphatic linear chain- and branched chain-, mono- and polyene acids having from three to 22 carbon atoms, and monocyclic and polycyclic mono- and polyene acids having from three to 22 carbon atoms. As the aliphatic monoene acids, there can be mentioned, for example, undecylenic acid, myristoleic acid, palmitoleic acid, oleic acid, elaidic acid and erucic acid. As the fatty diene acids, there can be mentioned, linoleic acid, lineolaidic acid and conjugated linoleic acid. As the aliphatic triene acids, there can be mentioned linolenic acid and conjugated linolenic acid. As the alicyclic unsaturated acids, there can be mentioned cyclopentene carboxylic acids, methylcyclopentene carboxylic acids and cyclohexene carboxylic acids. As saturated alcohols which form esters with unsaturated fatty acids, there can be used alcohols of the formula ROH in which R is alkyl having from one to eight carbon atoms or saturated monocyclic hydrocarbon radical having from three to eight carbon atoms, for example, straight chain alkanols such as methyl alcohol, ethyl alcohol, n-butyl alcohol and n-octyl alcohol; branched chain alkanols such as i-propyl alcohol, i-butyl alcohol, i-amyl alcohol and 2-ethylhexanol; and monocyclic alcohols such as cyclohexanol and methylcyclohexanol. Of course, mixtures of two or more phenolated fatty acid esters are included within the scope of the invention.

The proportion of phosphorus oxyhalide to phenolated fatty acid ester employed in the reaction of the present invention is 1 mole of phosphorus oxyhalide to 3 moles or more of phenolated fatty acid ester. In the production of tertiary phosphoric esters of phenols, 3 moles, or more, of phenols are used generally per one mole of phosphorus oxyhalide. However, according to the present invention, the phenolated fatty acid ester is not necessarily used in an excess amount of more than 3 moles. The reaction can be completed sufficiently by using only 3 moles of the phenolated fatty acid ester per one mole of phosphorus oxyhalide, through an excess amount can be used without any trouble.

When metal catalyst is used in the present invention, the amount thereof is from 0.1 to 10 wt. percent, more preferably 0.5 to 5 wt. percent, based on the weight of the phenolated fatty acid ester. If a tertiary amine is used, the amount thereof is more than 3 moles, preferably more than 3.3 moles, per one mole of the phosphorus oxyhalide.

In the reaction of a phenolated fatty acid ester with phosphorus oxyhalide in the presence of a tertiary amine, according to the present invention, it is advantageous to use a suitable reaction solvent, because the starting phenolated fatty acid ester and the resulting tertiary phosphoric esters are highly viscous liquids at usual reaction temperatures and because the produced tertiary amine salts with hydrohalogenic acid are usually in solid form.

When reaction solvents of low polarity such as petroleum ether, n-hexane, n-heptane, cyclohexane, benzene or toluene are used, the tertiary amine salt with hydrohalogenic acid is insoluble therein, though the starting compounds and the final tertiary phosphoric acid ester of phenolated fatty acid ester are soluble therein and, accordingly, separation and purification steps become simple.

The present invention will be further described by means of the following illustrative examples. In the examples, all "parts" are parts by weight, unless otherwise noted.

EXAMPLE 1

Into a four-neck flask were charged 59.1 parts of phenolated methyl linoleate (acid value = 2.4, saponification value = 146.7, hydroxyl value = 142.3). 7.7 parts of phosphorus oxychloride ($POCL_3$) were added thereto dropwise, under a nitrogen stream, at a temperature kept in the range of 120° – 140° C over a period of about 5 minutes. After about 30 minutes, reflux of phosphorus oxychloride ceased, the temperature was then elevated to 200° C and the reaction was continued under heating at this temperature for 4 hours. Upon completion of the reaction under heating, the resulting hydrogen chloride was distilled off under reduced pressure giving 59.3 parts (yield 96.7 percent) of a dark red, viscous product as the distillation residue. $n_D^{23.5}$ was 1.5090.

The product contained bound chlorine. The bound chlorine content was not changed after heating the product together with a large excess of methyl alcohol under reflux for 3 hours.

Analysis:

|  | Found | Calculated |
|---|---|---|
| Acid value | 15.3 | 2.3 |
| Saponification value | 144.8 | 141.4 |
| Hydroxyl value | 4.3 | 0 |
| Bound chlorine | 0.98% | 0% |
| Ionic chlorine | 0.00% | 0% |
| Phosphorus | 1.6% | 2.5% |

| IR. | (liquid film) (cm$^{-1}$) | | |
|---|---|---|---|
| | 1740(s), 1720(s) | $\nu C = O$ | ester —COOCH$_3$ |
| | 1610 (m), 1500 (m) | | benzene nucleus |
| | 1360 (m) | $\nu P = O$ | |
| | 1200–1260 (s) | $\nu C - O$ | P-O-C aryl |

EXAMPLE 2

Into a four-neck flask were charged 19.0 parts of the same phenolated methyl linoleate as used in Example 1, 2.1 parts of pyridine and 20 parts by volume of benzene. 1.2 Parts of phosphorus oxychloride ($POCl_3$) were added thereto dropwise at a temperature kept in the range of 5° – 10° C. After heating under reflux for an additional 2 hours, the mixture was cooled to room temperature. The precipitated pyridine salt was separated by filtration. The filtrate was washed with water and dried over anhydrous sodium sulfate. Low-boiling fraction was distilled out under reduced pressure of 150° C/0.5 mmHg giving 18.5 parts of light yellow viscous product as the distillation residue (yield 95.3 percent). $n_D^{23.5}$ was 1.5110.

Analysis:

|  | Found | Calculated |
|---|---|---|
| Acid value | 6.0 | 2.3 |
| Saponification value | 134.8 | 141.4 |
| Hydroxyl value | 10.1 | 0 |
| Chlorine | 0.00% | 0 |
| Phosphorus | 2.1% | 2.5% |

| IR. | (liquid film) (cm$^{-1}$) | | |
|---|---|---|---|
| | 1740 (s), 1720 (s) | $\nu C = O$ | ester -COOCH$_3$ |
| | 1610 (m), 1590 (m), 1510 (m) | | benzene nucleus |
| | 1360 (m) | $\nu P = O$ | |
| | 1200–1260 (s) | $\nu C - O$ | P-O-C aryl |

EXAMPLE 3

Into a four-neck flask were charged 35.4 parts of phenolated methyl oleate (acid value = 0.91, saponification value = 145.6, hydroxyl value = 142.7). 4.6 Parts of phosphorus oxychloride ($POCl_3$) were added thereto dropwise under nitrogen stream at 120° C. After 30 minutes, reflux of phosphorus oxychloride ceased, the temperature was elevated to 180° C and the mixture was heated to that temperature with stirring for 5 hours. By-produced hydrogen chloride was distilled out under reduced pressure giving 35.0 parts (yield 95.1 percent) of light yellow, viscous product as the distillation residue. $n_D^{22}$ was 1.5019. Analysis:

|  | Found | Calculated |
|---|---|---|
| Acid value | 4.3 | 0.9 |
| Saponification value | 140.4 | 135.3 |
| Hydroxyl value | 16.2 | 0 |
| Chlorine | 0.00% | 0% |
| Phosphorus | 2.1% | 2.5% |

| IR. | (liquid film) (cm$^{-1}$) | | |
|---|---|---|---|
| | 1740 (s), 1720 (s) | $\nu C = O$ | ester -COOCH$_3$ |
| | 1610 (m), 1590 (m), 1510 (m) | | benzene nucleus |
| | 1360 (m) | $\nu P = O$ | |
| | 1200–1260 (s) | $\nu C - O$ | P-O-C aryl |

EXAMPLE 4

Into a four-neck flask were charged 35.4 parts of the same phenolated methyl oleate as used in Example 3 and 0.2 part of magnesium chloride. 4.6 Parts of phosphorus oxychloride ($POCl_3$) were added thereto dropwise under nitrogen stream at 120° C. Thereafter, the temperature was elevated to 160° C and the mixture was heated at this temperature with stirring for 4 hours. The mixture was cooled to room temperature. The mixture was then dissolved in 200 parts by volume of ether and washed with 50 parts by volume of water five times. The ether layer was dried over anhydrous sodium sulfate and low boiling fraction was distilled out under reduced pressure giving 35.0 parts (yield 95.1 percent) of light yellow, viscous product as the distillation residue. $n_D^{22}$ was 1.5015. Analysis:

|  | Found | Calculated |
|---|---|---|
| Acid value | 5.2 | 0.9 |
| Saponification value | 160.3 | 135.3 |
| Hydroxyl value | 15.0 | 0 |
| Chlorine | 0.00% | 0% |
| Phosphorus | 2.1% | 2.5% |

IR. (liquid film) (cm$^{-1}$)
| | | |
|---|---|---|
| 1740 (s), 1720 (s) | C = O | ester -COOCH$_3$ |
| 1610 (m), 1590 (m), 1510 (m) | | benzene nucleus |
| 1360 (m) | P = O | |
| 1200-1260 (s) | C - O | P-O-C aryl |

The structural formula of the product according to the present invention is assumed to be as follows:

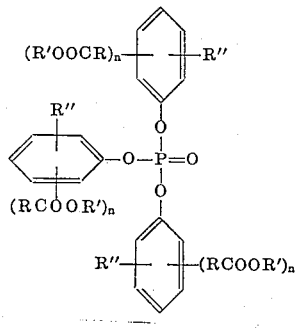

wherein:
  $n$ is a number from 1 to 2
  R is an aliphatic divalent saturated or unsaturated hydrocarbon radical having from two to 21 carbon atoms or an alicyclic hydrocarbon radical having from 2 to 21 carbon atoms
  R' is alkyl having from one to eight carbon atoms or an alicyclic hydrocarbon radical having from three to eight carbon atoms; and
  R'' is H or CH$_3$.

The embodiments of the invention in which an exclusive property or privilege is claimed are defined as follows:

1. A compound of the formula

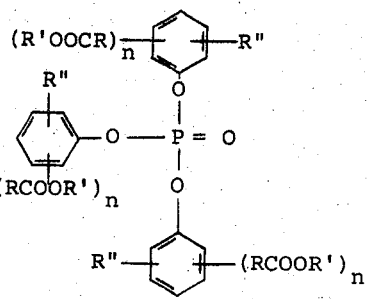

wherein
  $n$ is a number from 1 to 2,
  RCOOR' is a moiety of an ester of a fatty acid selected from the group consisting of undecylenic acid, myristoleic acid, palmitoleic acid, oleic acid, elaidic acid, erucic acid, linoleic acid, linoelaidic acid, conjugated linoleic acid, linolenic acid, conjugated linolenic acid, cyclopentene carboxylic acids, methylcyclopentene carboxylic acids and cyclohexene carboxylic acids, esterified with an alkanol having one to eight carbon atoms, cyclohexanol or methylcyclohexanol, and R'' is H or CH$_3$.

2. A compound according to claim 1, in which RCOOR' is methyl lineoleate.

3. A compound according to claim 1, in which RCOOR' is methyl oleate.

* * * * *